(12) United States Patent
Lim et al.

(10) Patent No.: US 9,363,052 B2
(45) Date of Patent: Jun. 7, 2016

(54) WIRELESS TRANSMITTING AND RECEIVING UNIT FOR PROVIDING SERVICE OR ACTIVITY IN WIRELESS LOCAL ACCESS NETWORK

(75) Inventors: Jaewon Lim, Anyang-si (KR); Yunjung Yi, Anyang-si (KR); Suhwook Kim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/239,984

(22) PCT Filed: May 25, 2012

(86) PCT No.: PCT/KR2012/004169
§ 371 (c)(1),
(2), (4) Date: Feb. 20, 2014

(87) PCT Pub. No.: WO2013/032110
PCT Pub. Date: Mar. 7, 2013

(65) Prior Publication Data
US 2014/0226585 A1 Aug. 14, 2014

Related U.S. Application Data

(60) Provisional application No. 61/528,294, filed on Aug. 29, 2011.

(51) Int. Cl.
*H04L 5/00* (2006.01)
*H04W 48/12* (2009.01)
*H04W 48/18* (2009.01)

(52) U.S. Cl.
CPC .......... *H04L 5/0037* (2013.01); *H04W 48/12* (2013.01); *H04L 5/0091* (2013.01); *H04W 48/18* (2013.01)

(58) Field of Classification Search
CPC ........................ H04L 5/0037; H04W 48/12
See application file for complete search history.

(56) References Cited

U.S. PATENT DOCUMENTS

2004/0246983 A1* 12/2004 Kaatz ........................... 370/432
2008/0307340 A1* 12/2008 Kojima ............. G06F 17/30899
715/764

(Continued)

FOREIGN PATENT DOCUMENTS

KR   10-2011-0037247   4/2011
KR   10-2011-0064289   6/2011

OTHER PUBLICATIONS

PCT International Application No. PCT/KR2012/004169, Written Opinion of the International Searching Authority dated Dec. 18, 2012, 14 pages.

*Primary Examiner* — Fan Ng
(74) *Attorney, Agent, or Firm* — Lee, Hong, Degerman, Kang & Walmey; Jonathan Kang; Michael Monaco

(57) ABSTRACT

Disclosed are a wireless transmitting and receiving unit for supporting an AP-based social communication service or activity, and a communication method thereof. A communication method of a wireless transmitting and receiving unit (WRTU), according to one embodiment disclosed in the present invention, includes the steps of: receiving a beacon signal, which contains service or activity identification information and information on a communication scheme, from an access point (AP); selecting the service or activity on the basis of the identification information; and performing an operation corresponding to the communication scheme when the service or activity is selected, wherein the communication scheme is designated to a first scheme for transmitting data frames to and receiving data frames from another wireless transmitting or receiving unit, which has selected the service or activity, or to a second scheme for receiving data frames from the access point.

14 Claims, 6 Drawing Sheets

(56) References Cited

U.S. PATENT DOCUMENTS

| | | |
|---|---|---|
| 2009/0215469 A1 | 8/2009 | Fisher et al. |
| 2009/0312033 A1 | 12/2009 | Shen et al. |
| 2010/0313142 A1 | 12/2010 | Brown |
| 2011/0082939 A1* | 4/2011 | Montemurro et al. ........ 709/227 |
| 2013/0027289 A1* | 1/2013 | Choi .................. G06F 3/14 345/156 |

* cited by examiner

WIRELESS TRANSMITTING AND RECEIVING UNIT FOR PROVIDING SERVICE OR ACTIVITY IN WIRELESS LOCAL ACCESS NETWORK

CROSS-REFERENCE TO RELATED APPLICATIONS

This application is the National Stage filing under 35 U.S.C. 371 of International Application No. PCT/KR2012/004169, filed on May 25, 2012, which claims the benefit of U.S. Provisional Application Ser. No. 61/528,294, filed on Aug. 29, 2011, the contents of which are all hereby incorporated by reference herein in their entirety.

FIELD OF THE INVENTION

The present invention relates to a wireless transmitting and receiving unit for providing service or activity in a wireless local access network and a communication method of the same.

BACKGROUND ART

With the evolution in the WLAN (Wireless Local Access Network), users of mobile terminals (or user equipments), such as laptop computers, are capable of performing their tasks with the help of increased mobility. For example, the user may be capable of taking his (or her) laptop computer to a conference room when attending a meeting or conference and may, then, access a local network through the WLAN.

In a system that is based upon the IEEE (Institute of Electrical and Electronics Engineering) 802.11 standard, BSS (Basic Service Set) refers to a collection of stations, which have successfully established synchronization. Additionally, a Basic Service Area (BSA) refers to an area accommodating members configuring the BSS. The BSA may differ depending upon propagation characteristics of a wireless medium. The BSS may essentially be divided into two different configurations, such as an Independent BSS (IBSS) and an Infra-structured BSS. Herein, as a BSS configuring a self-contained network, the former corresponds to a BSS that is not authorized to access a Distribution System (DS), and, as a BSS including at least one or more APs (Access Points) and a distribution system, the latter corresponds to a BSS that uses an AP during all communication procedures generally including communication between the stations.

The IEEE 802.11 WLAN standard provides transmission rates of 11 Mbps (IEEE 802.11b) and 54 Mbps (IEEE 802.11a), which use an unlicensed band at 2.4 GHz or 5 GHz. IEEE 802.11g provides a transmission rate of 54 Mbps by applying OFDM (Orthogonal Frequency Division Multiplexing) at 2.4 GHz, and IEEE 802.11n provides a transmission rate of 300 Mbps for 4 spatial streams by applying MIMO-OFDM. In the IEEE 802.11n, a channel bandwidth of up to 40 MHz is supported, and, in this case, a transmission rate of 600 Mbps is provided.

Recently, diverse types of social networking based services, such as Facebook, Twitter, Chatting, Social Commerce, Product Promotion, and so on, are being in the spotlight. Meanwhile, unlike the conventional social networking method, which is being serviced through the Internet, SNS services based upon locations, such as department stores, supermarkets, localized personal broadcasting, localized social networking services (SNSs) are under research and development.

DETAILED DESCRIPTION OF THE INVENTION

Technical Objects

The exemplary embodiments disclosed in this specification are to provide a wireless transmitting and receiving unit supporting an AP-based social communication service or activity and a communication method of the same.

Technical Solutions

A communication method of a Wireless Transmit/Receive Unit (WTRU) according to an exemplary embodiment disclosed in this specification includes the steps of receiving a beacon signal including identification information of a service or activity from an Access Point (AP) and information on a communication format; selecting the service or activity based upon the identification information; and performing an operation corresponding to the communication format, when the service or activity is selected, wherein the communication format is designated as any one of a first format transmitting and/or receiving a data frame to and/or from another Wireless Transmit/Receive Unit (WTRU), which has selected the service or activity, and a second format receiving a data frame from the access point.

According to the exemplary embodiment, the beacon signal further includes information on a radio resource of the service or activity.

Additionally, according to the exemplary embodiment, the information on a radio resource of the service or activity includes an offset time, a length, an interval, and a system parameter.

Additionally, according to the exemplary embodiment, the system parameter includes communication protocol information and information on the communication format.

Additionally, according to the exemplary embodiment, the system parameter further includes information on a host device.

Additionally, according to the exemplary embodiment, the information on a radio resource of the service or activity includes information on a frequency band.

Additionally, according to the exemplary embodiment, the service or activity is associated with a Social Network Service (SNS).

Meanwhile, a Wireless Transmit/Receive Unit (WTRU) according to an exemplary embodiment disclosed in this specification includes a transmitter/receiver configured to transmit and/or receive radio signals to and/or from an external source and/or target; and a controller being connected to the transmitter/receiver, wherein the controller is configured to control the transmitter/receiver to receive a beacon signal including identification information of a service or activity from an Access Point (AP) and information on a communication format, select the service or activity based upon the identification information, and control the transmitter/receiver to perform an operation corresponding to the communication format, when the service or activity is selected, wherein the communication format is designated as any one of a first format transmitting and/or receiving a data frame to and/or from another Wireless Transmit/Receive Unit (WTRU), which has selected the service or activity, and a second format receiving a data frame from the access point.

Additionally, according to the exemplary embodiment, the beacon signal further includes information on a radio resource of the service or activity.

Additionally, according to the exemplary embodiment, the information on a radio resource includes an offset time, a length, an interval, and a system parameter.

Additionally, according to the exemplary embodiment, the system parameter includes communication protocol information and information on the communication format.

Additionally, according to the exemplary embodiment, the system parameter further includes information on a host device.

Additionally, according to the exemplary embodiment, the information on a radio resource of the service or activity includes information on a frequency band.

Additionally, according to the exemplary embodiment, the service or activity is associated with a Social Network Service (SNS).

Effects of the Invention

According to the present invention, a wireless transmitting and receiving unit may provide an AP-based social service or activity, and, since a beacon signal, which is received from an AP, is used herein, an Association procedure is not required, and, accordingly, it will be advantageous in that the performance of the device is enhanced.

MODE FOR CARRYING OUT THE PRESENT INVENTION

Figure 1:
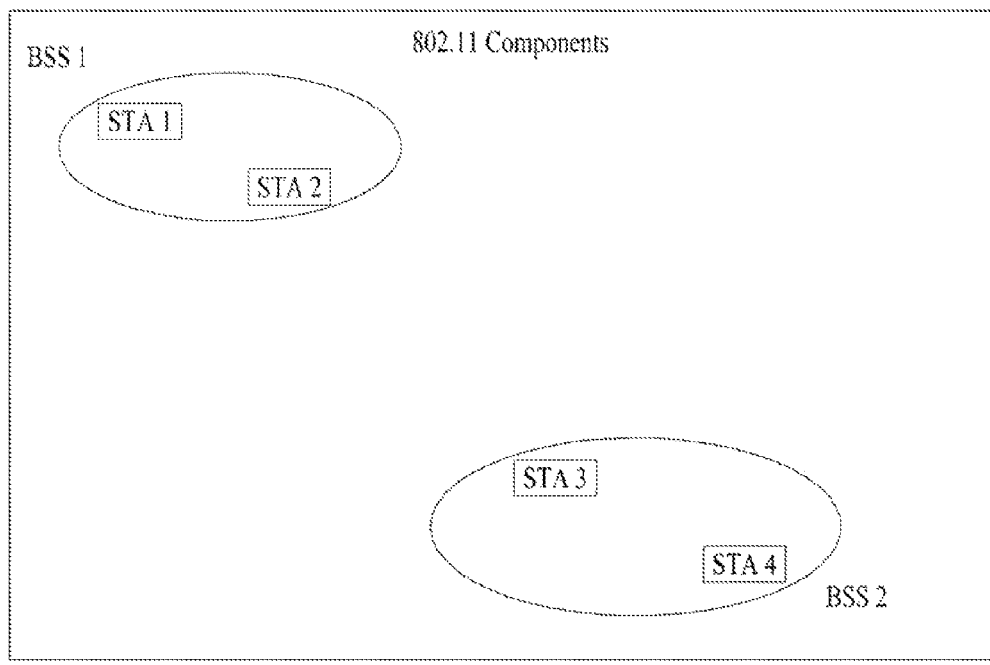
FIG. 1 illustrates a block view showing an IEEE 802.11 system.

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of " or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Additionally, the suffixes "module" and "unit" that are mentioned in the elements used in this specification are merely used individually or in combination for the purpose of simplifying the description of the present invention. Therefore, the suffix itself will not be used to differentiate the significance or function or the corresponding term.

Furthermore, terms including numeric expressions, such as first, second, and so on, used in the specification of the present invention may be used to describe diverse elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity.

Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

Hereinafter, before describing the exemplary embodiment of the present invention in detail, a brief description will be provided in order to facilitate the understanding of the present invention.

In the following description, an STA (Station) refers to an arbitrary device including a MAC (Medium Access Control) to a WM (Wireless Medium) and a PHY (PHYsical Layer).

The STA may correspond to an AP STA or a non-AP STA. However, hereinafter, unless indicated otherwise, the STA will refer to a non-AP STA. The STA may also be referred to as other terms, such as UE (user equipment), MS (mobile station), MT (mobile terminal), portable device, interface card, and so on.

Additionally, in the following description, an AP (Access Point) refers to an arbitrary entity, which has the function of an STA, and which provide access to a distributed service through a WM of associated STAs. In other words, the AP corresponds to a medium providing connection to the STA through a wireless medium. The AP may also be referred to as other terms, such as a centralized controller, a BS (base station), a scheduler, and so on.

Additionally, in the following description, an MS (Mobile Station) refers to a type of STA, which uses network communication while being in a mobile state. And, WM (Wireless Medium) refers to a medium that is used for realizing transmission of PDUs (Protocol Data Units) among peer physical layer (PHY) entities of the WLAN.

Description of FIG. 1

FIG. 1 illustrates a block view showing an IEEE 802.11 system.

An IEEE 802.11 architecture is configured of multiple components interacting with one another for providing a WLAN, which transparently supports an upper layer with STA mobility.

A BSS (Basic Service Set) corresponds to a basic component of the IEEE 802.11 LAN. The IEEE802.11 system shown in FIG. 1 includes two BSSs, wherein each BSS includes two user equipments (STAs) (STA1 to STA4), which correspond to members (or constituents) of each BSS. With the BSS of the IEEE 802.11 system, the STAs and the APs communicate with one another.

The BSS may correspond to an ellipse that is used for describing a coverage area, which allows the member user equipments (STA1 to STA4) of the BSS to maintain communication. This area corresponds to the so-called BSA (Basic Service Area). When a user equipment (STA1 and STA3) deviates from the BSA, the corresponding user equipment may no longer directly communicate with the other user equipments (STA2 and STA4) existing in the BSA.

Figure 2:
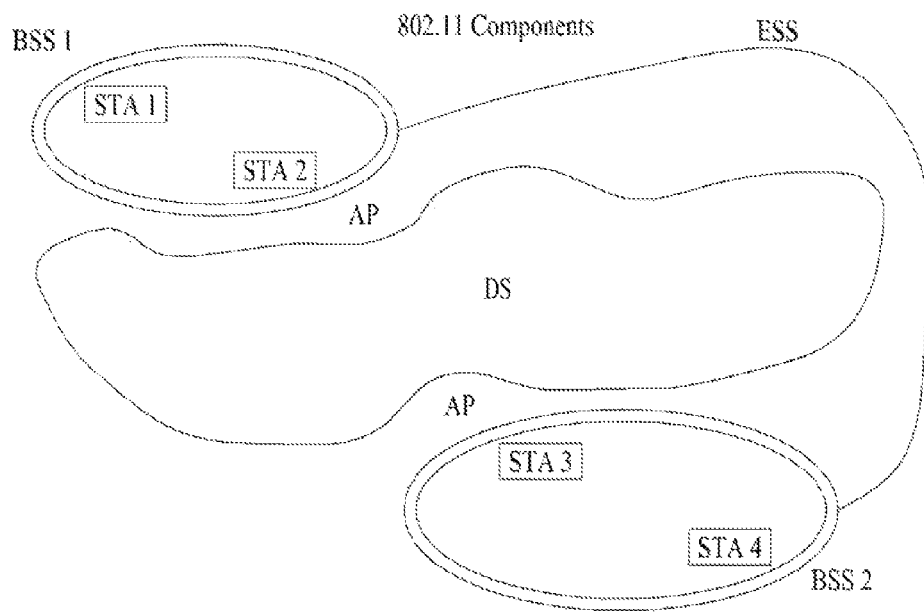
FIG. 2 illustrates a block view showing another IEEE802.11 system.

Description of FIG. 2

FIG. 2 illustrates a block view showing another IEEE802.11 system.

The WLAN system includes at least one BSS (basic service set). The BSS corresponds to a collection of stations (STAs), wherein each station is successfully synchronized in order to communicate with one another. The BSS may be divided into an Independent BSS and an Infrastructured BSS. Additionally, the BSS may exist independently or may configure a component of an extended network, which may be configured of multiple BSSs. A component of an architecture that is used to interconnect the BSSs corresponds to a DS (Distribution System).

The IEEE 802.11 standard logically differentiates a WM (Wireless Medium) from a DSM (Distribution System Medium). Each logical medium is used by a different component of the architecture and for a different purpose. The definition of the IEEE 802.11 does not make it impossible for nor require the multiple media to be identical to one another or to be different from one another.

Understanding that the multiple media are different from one another is fundamental in understanding mobility of the architecture. An IEEE 802.11 LAN architecture is designated to be independent from physical characteristics of any detailed embodiment.

By processing an address respective to destination mapping, and by providing a logical service required for a seamless integration of diverse BSSs, the DS enables the support of mobile device.

The AP refers to an arbitrary entity having the function of an STA and enabling access to a DS through a WM for associated STAs.

Data are transmitted between the BSS and the DS through the AP. It will also be noted that all APs correspond to STAs. Therefore, the APs correspond to addressable entities. The addresses used by the APs in order to perform communication over the WM and DSM are not necessarily identical.

Data that are transmitted to an STA address of an AP by one of the associated STAs, are always received by a port, which is not being controlled in order to be processed by an IEEE802.1X port access entity. Additionally, when a controlled port is licensed (or authorized), the frames conceptually change the DS.

The DS and BSSs generate a wireless network having an arbitrary size and complexity of the IEEE 802.11 standard. The IEEE 802.11 standard refers to this form of network as an ESS network. The ESS corresponds to a combination of BSSs, which are interconnected by the DS. The ESS does not include the DS.

The fundamental concept of the ESS network is that the ESS network appears to look like an IBSS (Independent Basic Service Set) in an LLC (Logical Link Control) layer. The STAs within the ESS may perform communication, and the STAs may shift from one BSS to another BSS (within the same ESS), which is transparent to the LLC.

The IEEE 802.11 standard does not make any assumptions on relative physical positions of the BSSs. Nevertheless, for example, the following cases are possible.

a) The BSSs may partially overlay with one another. This is generally used in order to position continuous coverage within a physical volume.

b) The BSSs may be physically divided. Logically, there is no limit in a distance between the BSSs.

c) The BSSs may be physically positioned in the same location. This is to provide overlaying characteristics.

d) One (or more than one) IBSS or ESS network may physically exist in the same space as one (or more than one) ESS network. This may occur due to diverse reasons. For example, this may occur when an Ad-hoc network is being operated in a location including an ESS network, when IEEE 802.11 networks that physically overlay with one another may be set up by a different organization, and when two or more different accesses and security protocols are required in the same location.

Referring to FIG. 2, BSS1 and BSS2 correspond to Infrastructured BSSs respectively including STA2(AP) and STA3 (AP). BSS1 includes STA1 and STA2(AP). BSS2 includes STA3(AP) and STA4. BSS1 and BSS2 are connected to one another by using a DS (Distribution System). ESS (extended service set) corresponds to multiple BSSs being connected to one another through the DS. In the same ESS, a non-AP STA may shift from one BSS to another BSS while performing seamless communication.

A method of performing AP based localized social communication within a WLAN is defined in this specification. More specifically, defined herein is a method of transmitting a data frame from the AP, wherein the data frame includes information on SCAs (Social Communication Activities), which operate within an AP coverage, and information on a social zone, in which the corresponding SCA is being serviced, and having MSs that have received the transmitted data frame to search for a social zone of an SCA, which the corresponding MS is interested in, so as to receive the data or to communicate with neighboring MSs by using the corresponding SCA method of the social zone.

The SCA (social communication activity), which is defined in this specification, refers to communication performed between devices that are interested in a same specific social service or social activity. Unlike the conventional communication method, which corresponds to a destination oriented communication method, wherein a device transmitting data between devices, such as MS or AP, is aware of the device type of a device receiving the transmitted data and delivers information accordingly, the devices receive information on the SCA instead of searching for a specific device, search for a communication area respective to the SCA, and communicate with other devices within the corresponding communication area. Additionally, such SCA may each have different communication characteristics, and, in order to perform communication between devices being interested in the same SCA, the operation method of the corresponding social activity shall be followed.

For reference, in this specification, the term device is used as a term including both AP and MS.

According to the exemplary embodiments disclosed in this specification, an AP, which manages SCAs existing within its coverage, transmits information on the SCA to the MSs, so that a specific SCA can be performed between the AP and an MS or between an MS and an MS. At this point, the SCA is serviced within a social zone, which is scheduled by the AP, and, herein, a social zone refers to a radio resource that can be searched by the AP or MS in order to perform the specific SCA and that can be data transmitted/received. The social zone may be defined by time-dividing the radio resource or by frequency-dividing the radio resource. In this specification, in order to describe the definition and actual application example of the social zone, an example of defining the social zone by time-dividing the radio resource will be provided.

Figure 3:
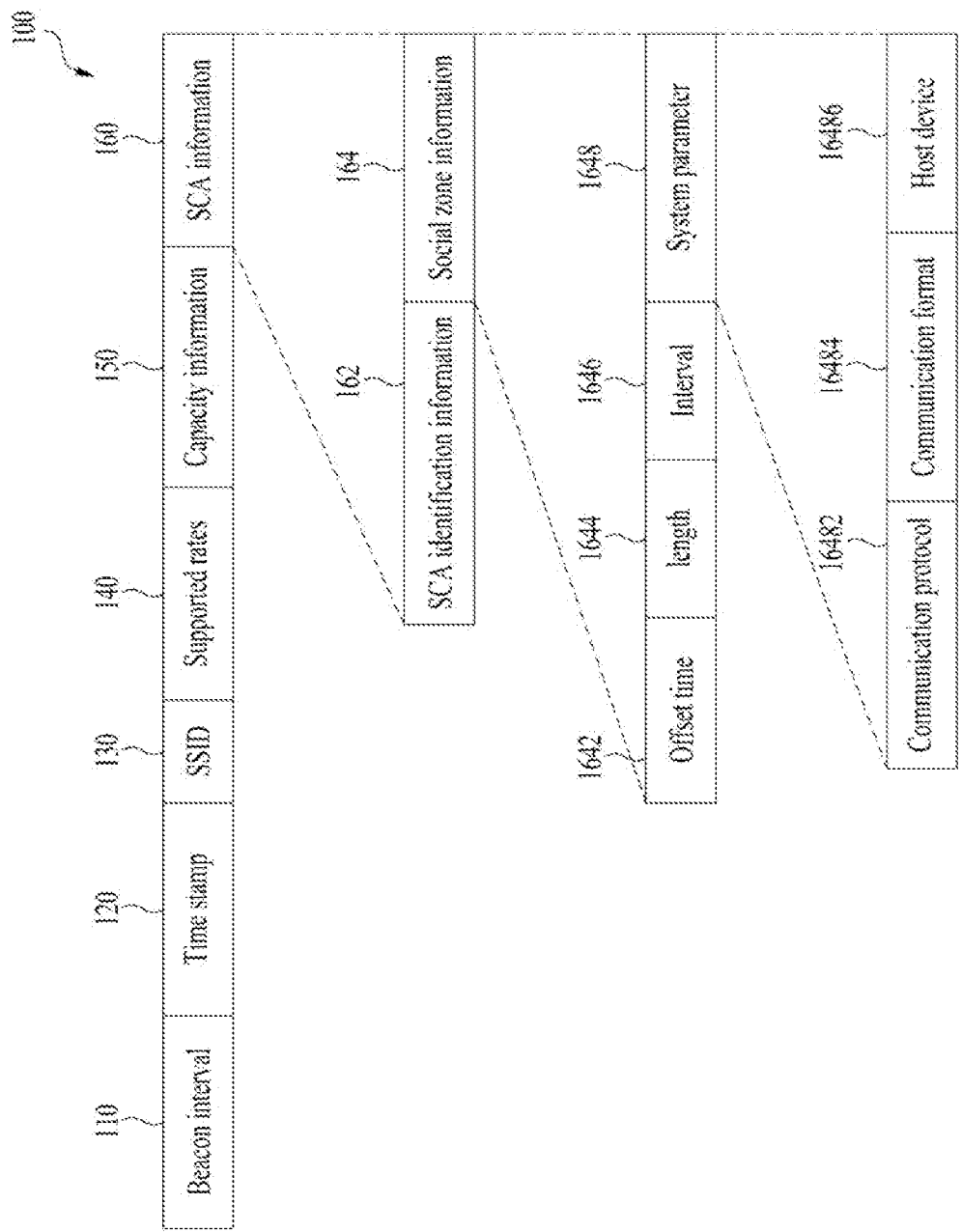
FIG. 3 illustrates a drawing disclosing an exemplary format of a beacon signal header (100).

Description of FIG. 3

FIG. 3 illustrates a drawing disclosing an exemplary format of a beacon signal header (100). The beacon signal header (100) may, for example, include a portion of a beacon signal frame, which is delivered from an access point to wireless (or radio) terminals. As shown in FIG. 3, such an exemplary embodiment of the beacon header (100) includes a beacon interval field (110), a time stamp field (120), a service set identifier (SSID) field (130), a supported transmission rate field (140), a capacity information field (150), and an SCA information field (160).

The AP according to an exemplary embodiment disclosed in this specification periodically transmits SCA information, which is included in its own communication range (coverage), to at least one MS through a Social Beacon (SB). The SCA information field (160), which is included in the social beacon, may include a Social Communication Activity ID (SCA_ID) field (162) and a Social Zone Information field (164). The social beacon may include a list of pairing information of (SCA_ID, social zone information).

SCA_ID corresponds to information that is pre-arranged between the AP and the MS, and a specific SCA_ID may be mapped to a specific SCA at a one-to-one correspondence. More specifically, as an example of the SCA_ID, SCAs, such as Chatting, Social Commerce Inform, Game, and so on, are converted to specific SCA_ID values, and the SCA_ID may be used by the AP for notifying the MS of information on a specific SCA for which a specific social zone is being used.

The social zone information is used for indicating how a social zone, which is being used for the specific SCA, is configured, and for indicating which communication method is to be applied by the MSs in order to be capable of performing communication within the corresponding social zone. The social zone information includes a social zone offset time field (1642), a social zone length field (1644), a social zone interval field (1646), and a social zone system parameter field (1648), and so on. Alternatively, the social zone information includes information on a frequency band. The information of the frequency band includes a starting frequency and an ending frequency.

The social zone offset time indicates when the corresponding social zone begins (or starts), i.e., a starting time, the social zone length indicates the size of the corresponding social zone, the social zone interval indicates a value respective to a specific interval at which the special zone is being iterated (or repeated), and the social zone system parameter includes communication parameters and communication protocol information, which the MSs should be aware of in order to perform communication in the corresponding social zone.

Herein, the social zone system parameter may include multiple system parameters. The social zone system parameter may include a communication protocol information field (16482), which is to be used within the corresponding social zone, a communication format information field (16484), and an information field (16486) on a specific host device, when the corresponding host device optionally exists. Herein, the communication protocol information of the social zone system parameter is used when designating a communication method between the devices, and conventional communication protocols, such as WiFi Direct or IEEE 802.11p, may be used or a communication protocol may be newly defined. The communication format information of the social zone system parameter may allow the MSs to decide the communication format which is to be used within the corresponding social zone in accordance with the social zone system parameter, and the communication format information also indicates whether or not such communication is being performed for the purpose of information delivery from one specific device to other multiple devices, or whether the communication format corresponds to communication between multiple arbitrary MSs being interested in the same SCA and intending to perform communication accordingly. Furthermore, the host device information of the social zone system parameter includes information designating a specific device, when a device configured to manage and relay the corresponding SCA exists.

Figure 4:
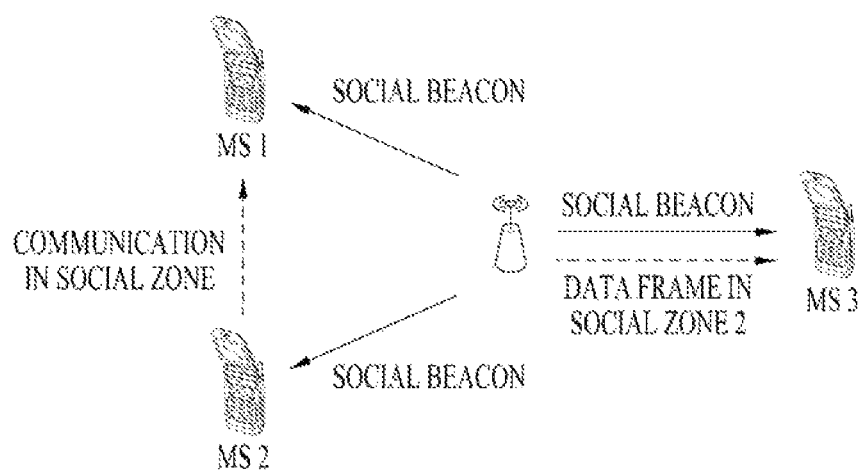
FIG. 4 illustrates a conceptual view showing operations performed by an AP for transmitting information on an SCA to MSs through a social beacon and searching for a social zone of an SCA, in which MSs that have received the corresponding information are interested, thereby performing SCA according to an exemplary embodiment of the present invention.

Description of FIG. 4

FIG. 4 illustrates a conceptual view showing operations performed by an AP for transmitting information on an SCA to MSs through a social beacon and searching for a social zone of an SCA to which MSs that have received the corresponding information are interested, thereby performing SCA according to an exemplary embodiment of the present invention.

Herein, information on a social zone of a first SCA and a second SCA is included in a social beacon, which is transmitted by the AP. The first SCA corresponds to an SCA designating communication operations performed between multiple MSs (MS1 and MS2) being interested in the first SCA, and the second SCA corresponds to an SCA including an operation of receiving data transmitted from the AP, wherein the receiving operation is performed by MSs (MS3) being interested in the second SCA.

More specifically, after receiving a social beacon from the AP, MS1 and MS2 search for a first social zone, in which MS1 and MS2 may communicate with one another. Then, after searching for one another, MS1 and MS2 communicate with one another in the first social zone. And, after receiving a social beacon from the AP, in order to perform an SCA of receiving a specific data frame the AP, which corresponds to an SCA that MS3 is interested in, MS3 receives a data frame from the AP in a second social zone.

Figure 5:
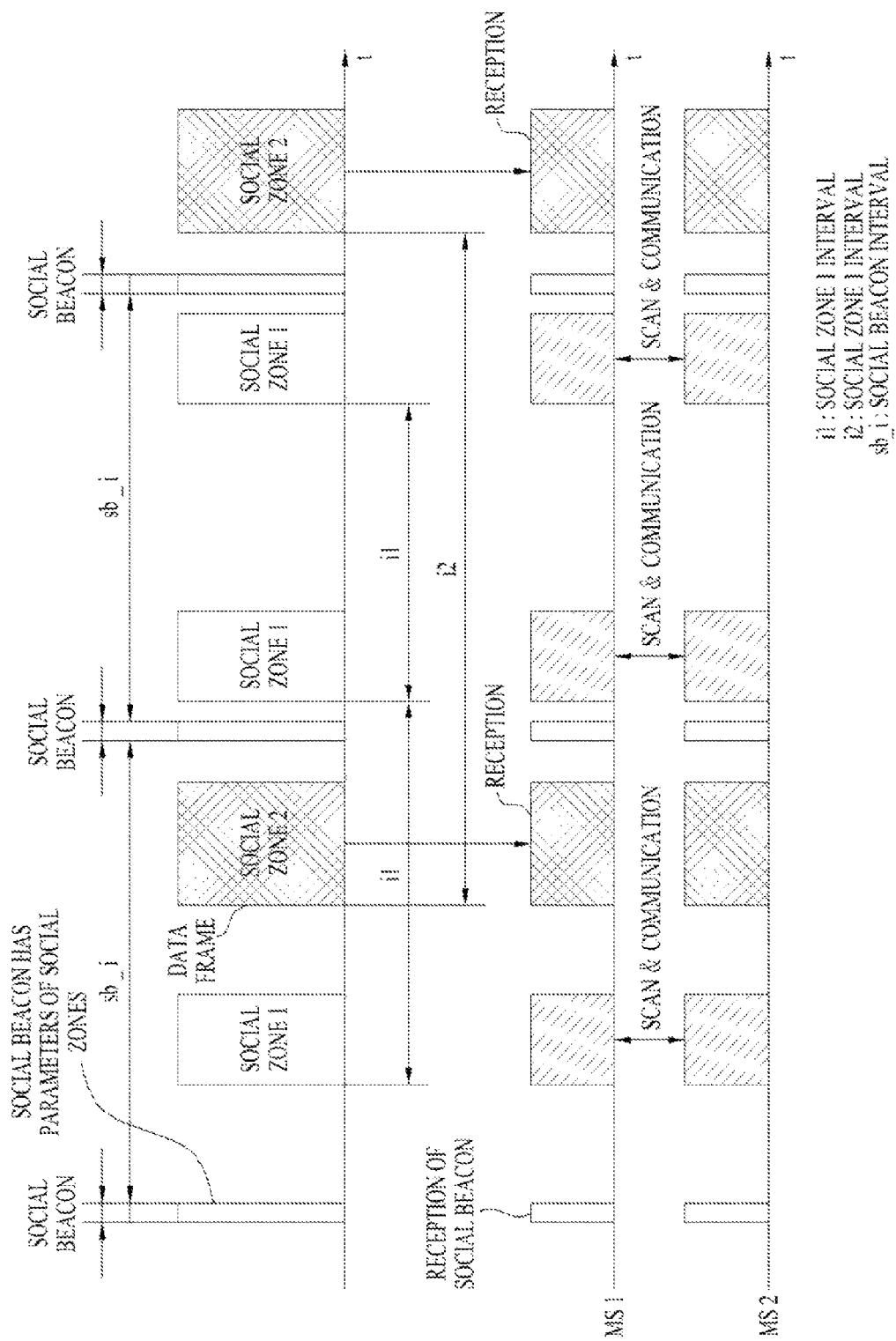
FIG. 5 illustrates a conceptual view showing a procedure, wherein an AP and MSs are operated in accordance with an AP based SCA communication method according to an exemplary embodiment of the present invention.

Description of FIG. 5

FIG. 5 illustrates a conceptual view showing a procedure, wherein an AP and MSs are operated in accordance with an AP based SCA communication method according to an exemplary embodiment of the present invention.

More specifically, the AP periodically transmits social beacons to MSs (MS1 and MS2) and transmits a data frame on a second social zone (Social Zone 2), wherein the second social zone corresponds to the social zone of the second SCA, which requires data transmission of the AP. In case of the first social zone (Social Zone 1), the AP includes information on the first social zone (Social Zone 1) in the social beacon and transmits the corresponding social beacon. However, in a time corresponding to the first social zone (Social Zone 1) specific operations associated with the first SCA are not performed, and MSs (MS1 and MS2) that are interested in the first SCA communicate with one another within the first social zone (Social Zone 1).

In FIG. 5, MS1 wishes to operate with respect to both the first SCA and the second SCA, wherein the first SCA may communicate with a neighboring MS within the first social zone (Social Zone 1), and wherein the second SCA may receive a data frame from the AP within the second social zone (Social Zone 2). And, accordingly, MS1 performs the appropriate operations within the first social zone and the second social zone. Since the second MS only wishes to perform the operations of the first SCA, the second MS searches for a neighboring terminal within the first social zone of the first SCA and perform communication with the corresponding neighboring terminal Description of FIG. 6

Figure 6:
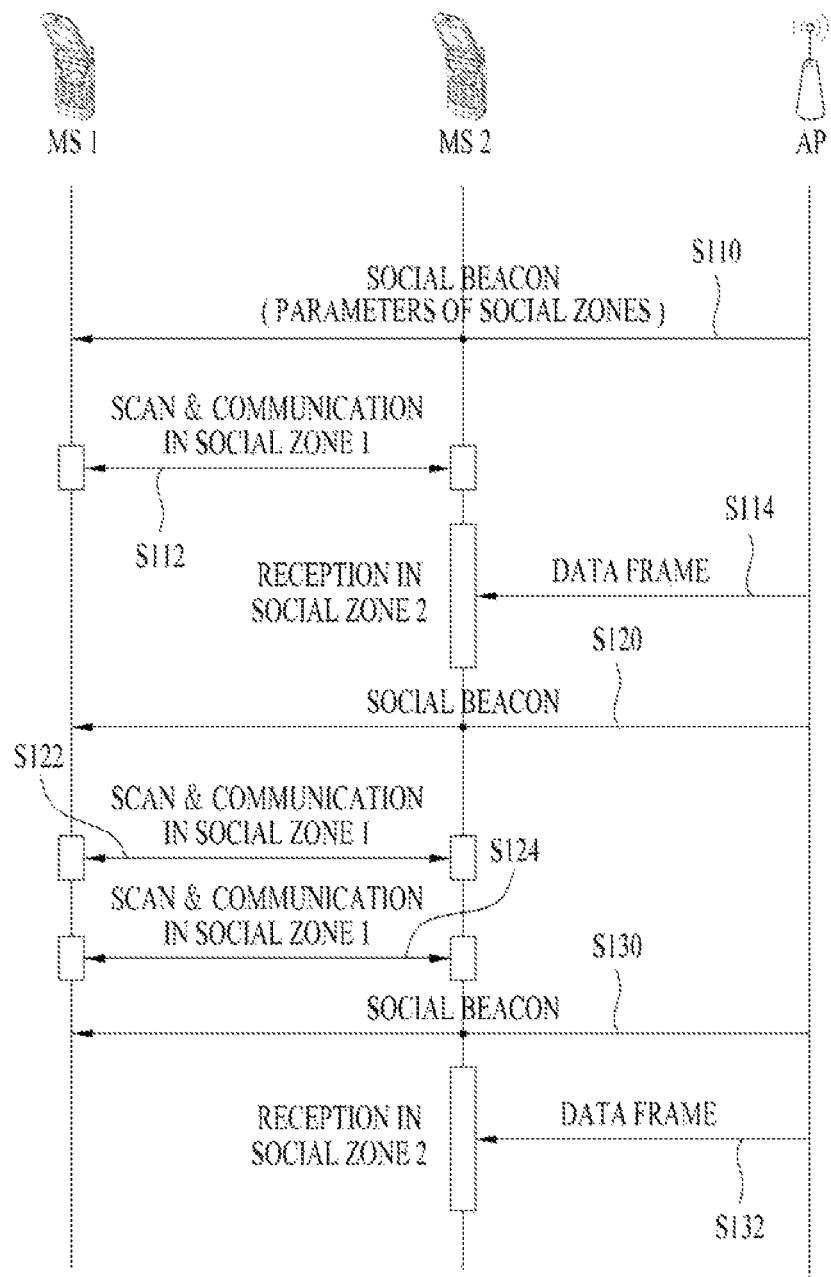
FIG. 6 illustrates a flow chart showing a process of exchanging a command frame and a data frame between MSs or between an AP and an MS in accordance with the AP based SCA communication method according to the exemplary embodiment of the present invention.

FIG. 6 illustrates a flow chart showing a process of exchanging a command frame and a data frame between MSs or between an AP and an MS in accordance with the AP based SCA communication method according to the exemplary embodiment of the present invention.

The AP periodically transmits social beacons to MS1 and MS2 (S110, S120, and S130). The social beacon includes information on the first SCA and the second SCA. The information on the first SCA and the second SCA includes identification information of each corresponding SCA and information on each corresponding social zone.

According to the first SCA, MS1 and MS2 search for the first social zone (Social Zone 1) and perform communication (S112, S122, and S124). For example, MS1 and MS2 may select the first SCA based upon the identification information of the first SCA. A time interval between step S112, step S 122, and step S124 is decided by a social zone interval, which is defined in the first social zone (Social Zone 1) information.

According to the second SCA, the AP transmits a data frame to MS2 (S114 and S132). For example, MS2 may select the second SCA based upon the identification information of the second SCA. More specifically, MS2 receives a data frame from the AP within the second social zone (Social Zone 2). A time interval between step S114 and step S132 is decided by a social zone interval, which is defined in the second social zone (Social Zone 2) information.

Figure 7:
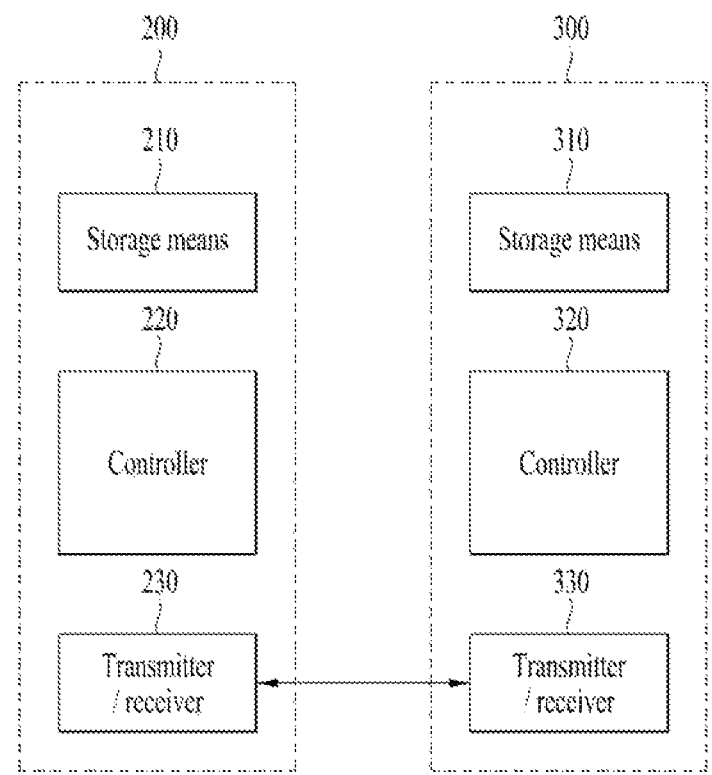
FIG. 7 illustrates a block view of an AP (200) and an MS (300) disclosed in the present specification.

Description of FIG. 7

FIG. 7 illustrates a block view of an AP (200) and an MS (300) disclosed in the present specification.

As shown in FIG. 7, the AP (200) includes a storage means (210), a controller (220), and transmitter/receiver (230). The storage means (210) stores the method according to the exemplary embodiment shown in FIG. 1 to FIG. 6. The controller (220) controls the storage means (210) and the transmitter/receiver (230). More specifically, the controller (220) executes each of the methods that are stored in the storage means (210). And, the controller transmits the above-described signals through the transmitter/receiver (230).

Additionally, as shown in FIG. 7, the MS (300) includes a storage means (310), a controller (320), and transmitter/receiver (330). The storage means (310) stores the method according to the exemplary embodiment shown in FIG. 1 to FIG. 6. The controller (320) controls the storage means (310) and the transmitter/receiver (330). More specifically, the controller (320) executes each of the methods that are stored in the storage means (310). And, the controller transmits the above-described signals through the transmitter/receiver (330).

Accordingly, the above-described embodiments are exemplary in all aspects of the invention and, therefore, should be understood without limitation. The scope of the present invention is indicated in the following appended claims rather than in the detailed description provided above. And, it should be understood that the significance and scope of the appended claims and that all modifications and variations of this invention drawn from their equivalents come within the scope of the appended claims.

What is claimed is:

1. A communication method of a Wireless Transmit/Receive Unit (WTRU), the communication method comprises:
   receiving, from an Access Point (AP), a beacon signal including identification (ID) information of a service or activity, communication format information related to the identification information, and social zone information,
   wherein the social zone information indicates time period of a social zone and a communication format used in the social zone;
   selecting the service or activity based upon the ID information,
   wherein the communication format is set to a first format when a first ID is selected and the communication format is set to a second format when a second ID is selected;
   communicating with another WTRU to exchange a data frame in a first social zone based on the selected service or activity when the communication format is set to the first format, and
   communicating with the AP to exchange a data frame in a second social zone based on the selected service or activity when the communication format is set to the second format.

2. The method of claim 1, wherein the beacon signal further includes information on a radio resource of the service or activity.

3. The method of claim 2, wherein the information on a radio resource of the service or activity includes an offset time, a length, an interval, and a system parameter.

4. The method of claim 3, wherein the system parameter includes communication protocol information and information on the communication format.

5. The method of claim 4, wherein the system parameter further includes information on a host device.

6. The method of claim 2, wherein the information on a radio resource of the service or activity includes information on a frequency band.

7. The method of claim 1, wherein the service or activity is associated with a Social Network Service (SNS).

8. A Wireless Transmit/Receive Unit (WTRU) comprising:
a transmitter configured to transmit radio signals to an external device;
a receiver configured to receive radio signals from the external device; and
a controller configured to control the transmitter and receiver,
wherein the controller is further configured to:
control the receiver to receive, from an Access Point (AP), a beacon signal including identification (ID) information of a service or activity, communication format information related to the identification information, and social zone information,
wherein the social zone information indicates time period of a social zone and a communication format used in the social zone;
select the service or activity based upon the ID information,
wherein the communication format is set to a first format when a first ID is selected and the communication format is set to a second format when a second ID is selected;
control the transmitter and receiver to communicate with another WTRU to exchange a data frame in a first social zone based on the selected service or activity when the communication format is set to the first format, and control the transmitter and receiver to communicate with the AP to exchange a data frame in a second social zone based on the selected service or activity when the communication format is set to the second format.

9. The Wireless Transmit/Receive Unit (WTRU) of claim 8, wherein the beacon signal further includes information on a radio resource of the service or activity.

10. The Wireless Transmit/Receive Unit (WTRU) of claim 9, wherein the information on a radio resource includes an offset time, a length, an interval, and a system parameter.

11. The Wireless Transmit/Receive Unit (WTRU) of claim 10, wherein the system parameter includes communication protocol information and information on the communication format.

12. The Wireless Transmit/Receive Unit (WTRU) of claim 11, wherein the system parameter further includes information on a host device.

13. The Wireless Transmit/Receive Unit (WTRU) of claim 9, wherein the information on a radio resource of the service or activity includes information on a frequency band.

14. The Wireless Transmit/Receive Unit (WTRU) of claim 8, wherein the service or activity is associated with a Social Network Service (SNS).

* * * * *